J. H. HACKFELD.
CULTIVATOR HOBBLE.
APPLICATION FILED JAN. 16, 1917.
1,241,110.
Patented Sept. 25, 1917.
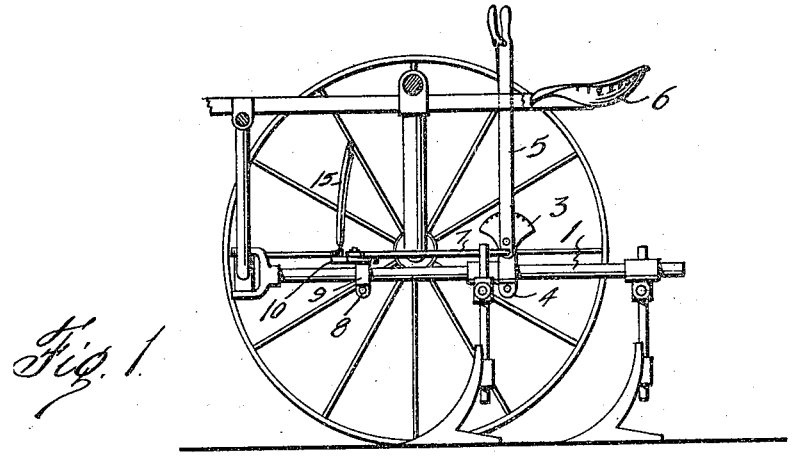
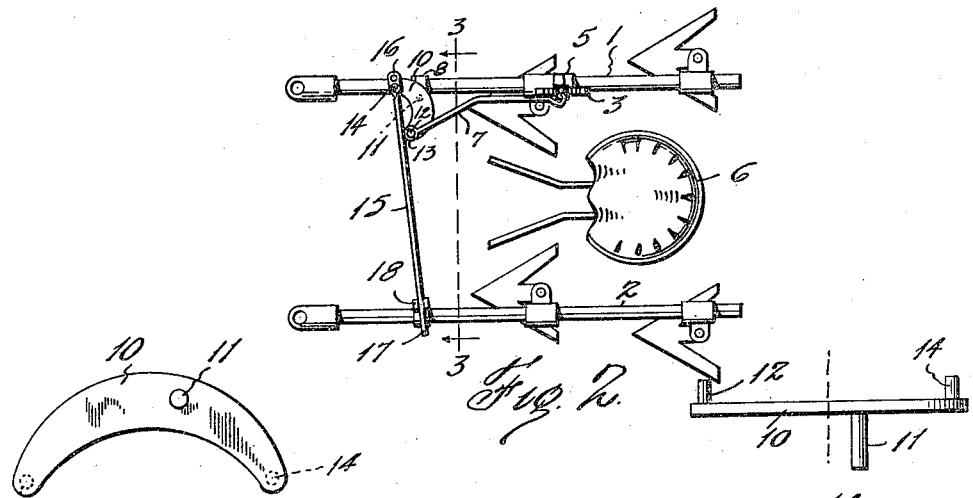
INVENTOR
J. H. HACKFELD.
BY
ATTORNEY

UNITED STATES PATENT OFFICE.

JOHN H. HACKFELD, OF CRAWFORD, TEXAS.

CULTIVATOR-HOBBLE.

1,241,110.      Specification of Letters Patent.   Patented Sept. 25, 1917.

Application filed January 16, 1917.  Serial No. 142,590.

*To all whom it may concern:*

Be it known that I, JOHN H. HACKFELD, citizen of the United States, residing at Crawford, in the county of McLennan and State of Texas, have invented certain new and useful Improvements in Cultivator-Hobbles, of which the following is a specification.

In operating a cultivator considerable advantage may be had by laterally spacing the beams whereby the gangs are either brought closer together or spread apart. By setting the beams so that the gangs pass in close proximity to the plants much labor is saved in chopping cotton. Under some conditions too much soil is thrown up about the plants, while in the same field with the same adjustment the soil displaced is not enough.

In order to easily and quickly spread the beams or draw them together attachments known as cultivator hobbles have been employed and this invention has to do with a particular kind of hobble which has been found very efficacious and easy to operate.

In carrying out the invention an arch bar is provided and is adjustably engaged with a clamp on one of the cultivator beams, while its opposite end is twisted at right angles and pivoted on the end of a segmental lever eccentrically pivoted on a clamp on the other beam.

A pitman has its forward end pivoted to the major leg of the lever and its rear end pivoted to an upright hand lever mounted on the correlated beam. The hand lever is positioned just forward and to one side of the seat and is thus conveniently arranged. By swinging the hand lever the segmental lever is swung and owing to its eccentric pivot point readily displaces the arch bar, whereby the beams are swung toward each other or spread apart.

The invention will be more readily understood from a perusal of the following specification and by reference to the accompanying drawings, wherein:

Figure 1 is a vertical longitudinal sectional view of a cultivator equipped with my hobble, Fig. 2 is a partial plan view of the parts shown in Fig. 1, Fig. 3 is a transverse sectional view on the line 3—3 of Fig. 2, Fig. 4 is an under side view of the segmental lever, and Fig. 5 is an elevational detail of the same.

In the drawings the numeral 1 designates one of the beams of the cultivator and 2 the other beam. The usual shovels and feet are connected with the beams and together therewith constitute the gangs. My hobble is in the nature of an attachment, complete in itself and applicable to any cultivator.

I provide a locking segment 3 having a depending clamp 4 which is adapted to embrace the beam 1. An upright hand lever 5 is pivoted on the segment and provided with the usual locking plunger. This lever projects in proximity to the seat 6 and is just forward of the same so as to be conveniently grasped by the driver. From the lower end of the lever 5 and below its pivot point, a pitman 7 extends forward along the inner side of the beam. The pitman is bent so as to freely pass projecting parts of the gang.

Relatively between the axle and the forward end of each beam a clamp 8 is fastened thereon. In many cultivators this clamp is found already in place, but it may be easily supplied if necessary. Each clamp has on its inner side a vertical socket 9 as is best shown in Fig. 3. One of the important features of the invention is a segmental lever 10 which is provided with a depending pivot stud 11 positioned eccentrically whereby the lever has a major leg and a minor leg. The stud 11 is inserted in the socket 9 of the clamp 8 of the beam 1 and the major leg is connected with the forward end of the pitman, said pitman having an eye 13 engaging a lug 12 on the lever 10. The advantage of the leverage lies with the pitman and the major leg of the lever. On the end of the minor leg a lug 14 is fixed. A flat arch bar 15 has one end 16 twisted at right angles and provided with perforations, while the opposite end 17 is bent laterally and also provided with perforations. The end 16 is pivoted on the lug 14, while the end 17 is fastened in a yoke-pin 18, a nice adjustment being afforded by means of the perforations.

The driver sitting in the seat 6 merely has to grasp the hand lever 5 and swing the same to adjust the gangs. By swinging the hand lever rearward the pitman is moved forward and the segmental lever 10 is swung so that the arch bar 15 is pulled toward the beam 1. Owing to the eccentric pivoting of the segmental lever as well as the form of the latter, sufficient force will be exerted to displace the beams and no great amount of energy need be used to swing the hand lever. When the hand lever is swung forward the pitman is drawn rearward and the gangs spread apart. Should the shovels be throwing too much soil around the plants or should it be desired to cultivate closer to the plants, the driver merely has to pull the hand lever rearward whereby the gangs are brought closer together. Should the reverse be the case it is merely necessary to swing the hand lever forward. The gangs are at all times under the control of the driver and may be spread or brought toward each other as the occasion may demand.

What I claim, is:

In a cultivator hobble, a socket having a clamp for engaging a cultivator beam, a flat segmental lever having a depending pivot stud positioned eccentrically, said stud engaging in the socket, a hand lever, a pitman connecting the hand lever with the long leg of the segmental lever, an arch bar connected with the short leg of the segmental lever, and a socket-clamp having pivotal connection with the other end of the arch bar and arranged to engage on a cultivator beam.

In testimony whereof I affix my signature.

JOHN H. HACKFELD.

Copies of this patent may be obtained for five cents each, by addressing the "Commissioner of Patents. Washington, D. C."